W. T. LEAVELLE.
COMBINED CULTIVATOR AND FERTILIZER DISTRIBUTER.
APPLICATION FILED JULY 29, 1913.

1,123,325.

Patented Jan. 5, 1915.
2 SHEETS—SHEET 1.

Inventor
William T. Leavelle

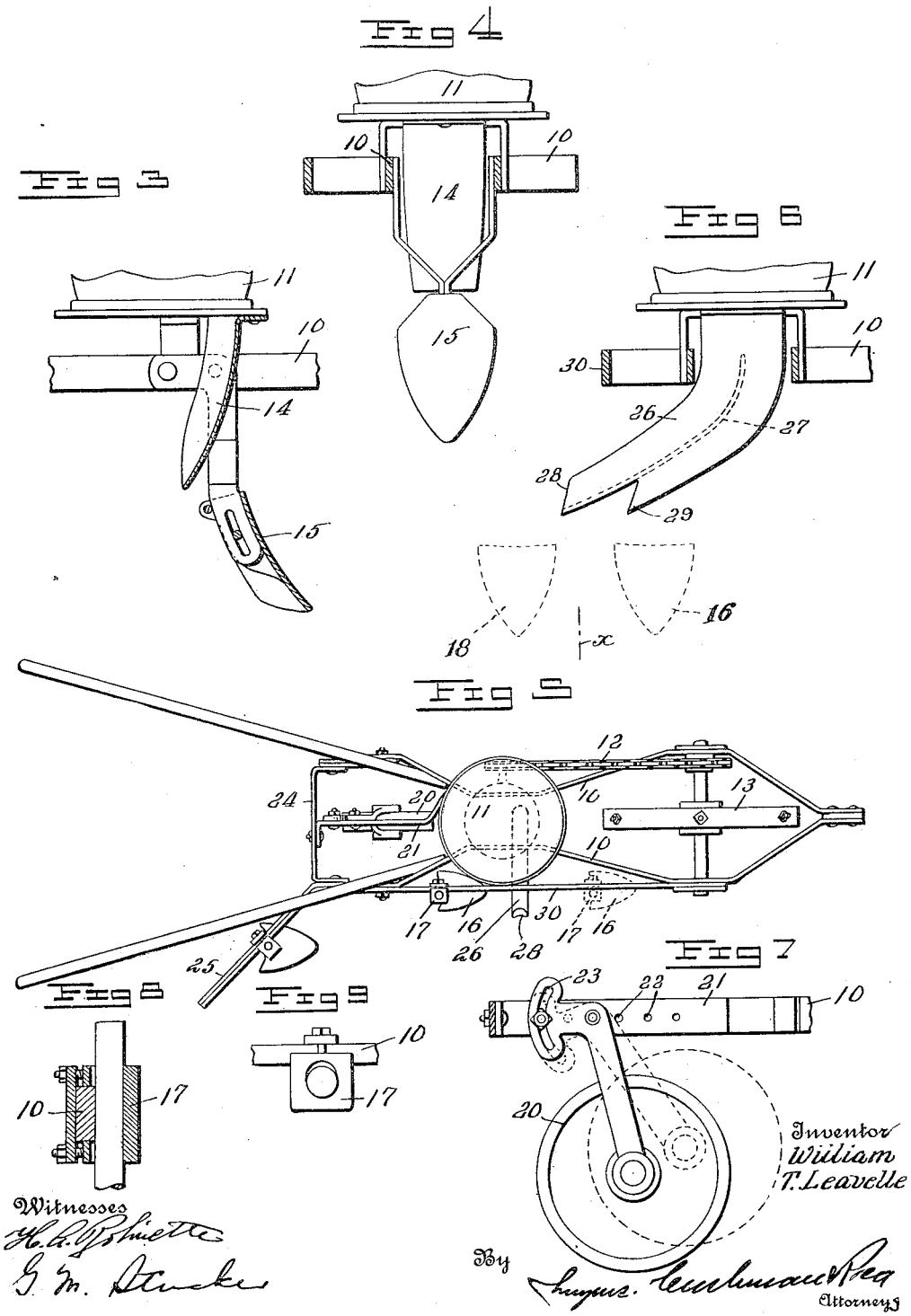

UNITED STATES PATENT OFFICE.

WILLIAM THOMAS LEAVELLE, OF YALE, VIRGINIA.

COMBINED CULTIVATOR AND FERTILIZER-DISTRIBUTER.

1,123,325.  Specification of Letters Patent.  Patented Jan. 5, 1915.

Application filed July 29, 1913. Serial No. 781,767.

*To all whom it may concern:*

Be it know that I, WILLIAM THOMAS LEAVELLE, a citizen of the United States, residing at Yale, in the county of Sussex and State of Virginia, have invented new and useful Improvements in Combined Cultivators and Fertilizer-Distributers, of which the following is a specification.

The present invention relates to combined cultivators and fertilizer distributers, and has for its object to provide an implement in which the distributing and cultivating instrumentalities are so associated and positioned as that cultivation, fertilization, and covering may be effected at one operation, thus doing away with the necessity of independent and separate operations of cultivating, depositing fertilizers, and covering.

In order that the invention may be clear to those skilled in the art, I disclose herein, by illustration and description, one embodiment of my invention, although it will be understood that such structural variations from this disclosure as are within the range of mechanical skill and expediency may be made without departing from the spirit of my invention.

Figure 1:
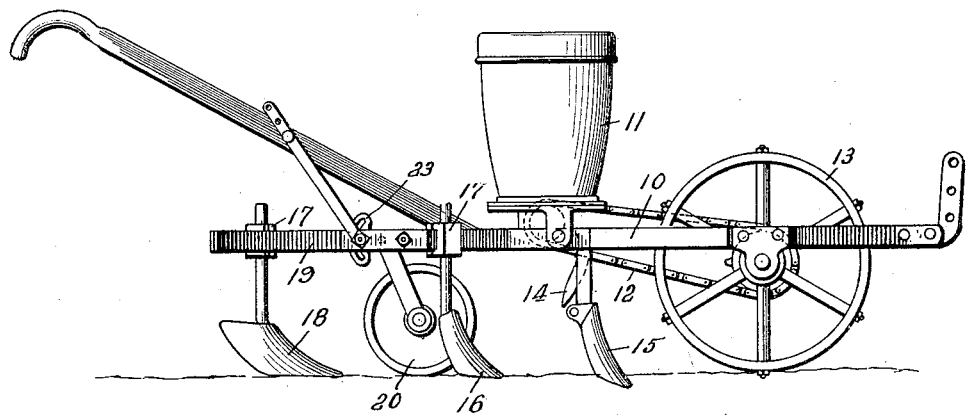
Figure 2:
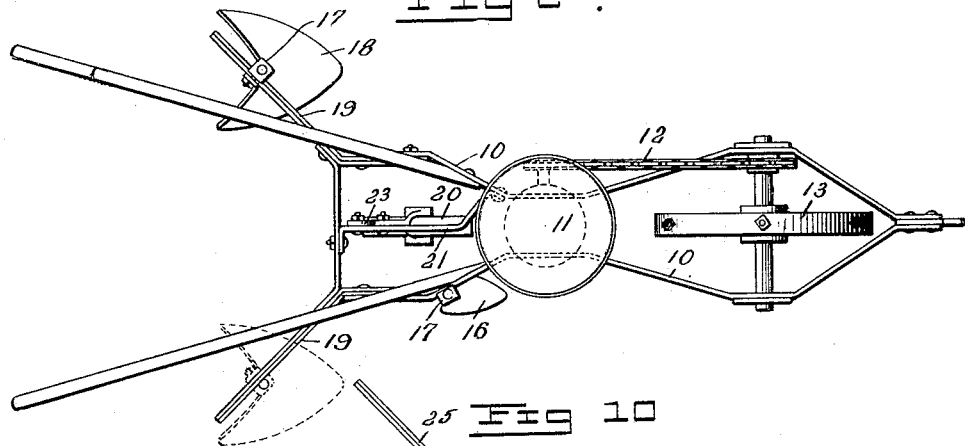
Figure 10:
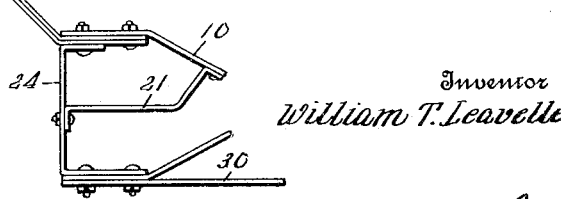

In the drawings forming the illustrative part of this disclosure; Figure 1 is a side view of an implement embodying my invention. Fig. 2 is a plan view of the implement shown in Fig. 1. Fig. 3 is a detail side view of a part of the hopper-feed and the opener therefor. Fig. 4 is a front view of the feed and opener. Fig. 5 is a plan view of the implement with certain supplemental attachments thereon especially fitting it for side delivery of fertilizers. Fig. 6 is a detail side view of the hopper and side-delivery spout. Fig. 7 is a detail side view of the depth regulating wheel. Figs. 8 and 9 are sectional and top views, respectively, of the tooth-supporting and securing clamps. Fig. 10 is a plan view of a supplemental tooth supporting frame.

Referring to the drawings by numerals, like numbers indicating like parts in the several views, 10 designates the frame, which may be of any suitable design, having mounted thereon a fertilizer or seed hopper 11, which is of any desired type, and is operatively connected by suitable sprocket chain 12 with the shaft of the traction wheel 13 mounted on the forward part of the frame. The said hopper is provided with a feed chute which may be centrally placed with respect to the machine as at 14 in Figs. 1 and 2 to deliver in rear of the opener 15, or it may be extended to one side or the other of the machine as at 26, Figs. 5 and 6.

Mounted on the frame 10 and offset from the line of deposit of the fertilizer is a cultivator tooth 16 which is designed to work between the row and the line of deposit of the fertilizer, it being desirable in certain lines of cultivation to deposit fertilizer at the sides of the row where the roots, more particularly of corn, extend, in order that the fertilizing material may be taken up by sidewise extending roots, but at the same time it is desirable to cultivate corn or other crops close to the row, and inside of the line of deposit of the fertilizer. This result is secured by positioning the tooth 16 as shown, so that it operates between the line of deposit of the fertilizer and close to the row. The said tooth 16 is adjustably mounted on the side rail of the frame 10, as shown, by means of a clamp 17 of any suitable construction, and, as shown in Figs. 1 and 2, the tooth 16, being on a diverging portion of the side rail, its longitudinal and transverse adjustment to position it properly with respect to the row and the line of deposit of the fertilizer may be readily accomplished.

It is desirable that when the fertilizing furrow is opened by the opener 15, and the fertilizer is deposited therein from the hopper, that it be covered, and in order that the implement may meet this desirability I provide the covering blade 18, which is adjustably mounted by means of a clamp 17 similar to that just described on a diverging or flaring rail 19, of a detachable frame which is bolted to the rear of the frame 10, as shown in the plan view Fig. 2. By this construction the coverer may be positioned in any desired relation to the line of fertilizer so as to effectively cover the same after it has been deposited, this coverer 18, as is obvious, working outside of the line of deposit of the fertilizer.

As shown in Figs. 1 and 2 the supplemental frame 19 has diverging side rails at its rear end on both sides to which the blades 18 may be adjustably secured, so that by simply removing the opener 15 and the cultivator 16, the implement may be used for listing in laying off the bed.

It is desirable, of course, that the depth of the opener, cultivator tooth, and coverer be regulated in order that the work of the operator may be lightened, and the weight of the implement to secure proper regulation of depth be not supported by the handles, and to accomplish this I provide in rear of the hopper, and at a point calculated to most effectively regulate the depth of the teeth, a depth regulating and supporting wheel 20, which is pivoted to the central bar 21, provision being made for adjustment along this bar by means of the pivot pin holes 22, and the wheel 20 may be raised and lowered by means of the slot and bolt adjustment 23, shown in detail in Fig. 7.

It some times happens that after the crop has grown to a considerable height it is not feasible to use the frame having the flaring side rails 19 at both sides, for the reason that the rail 19 adjacent the row would break down the corn or other crop, and I therefore provide a second frame, as shown in Fig. 10, this frame 24 fitting the main frame 10, and having the single side rail 25 on which the coverer may be adjustably secured. This adapts the implement to the working of crops which must be fertilized and cultivated after they have reached a considerable height without danger of damaging them.

The implement as thus far described is designed for feeding the fertilizer centrally and directly beneath the hopper, but it some times happens that a side feed for the fertilizer is desirable, and I have shown in Figs. 5 and 6 the implement adapted to side delivery, in which case the delivery spout 26 will be directed to the side of the hopper instead of the front thereof, as heretofore described. This side delivery spout may be of any desired type, but in Fig. 6 I have shown it adapted to feed fertilizer to both sides of a row at one side of the machine, this being accomplished by providing the spout with a central partition 27 which will divide the flow of the hopper and deliver it on separated line $x$ from the mouths 28, 29 of the spout, so that it will fall on either side of the row, which is indicated by dotted lines in Fig. 6. With this side delivery it will be seen that the cultivator tooth 16 and the cultivator tooth or coverer 18 will straddle the row and serve to cover the fertilizer and at the same time cultivate the row, as diagrammatically illustrated in Fig. 6.

It some times happens that it is desirable to bring the line of fertilizer close to the row, and in order to provide an attachment for the implement by which this may be accomplished I furnish a side bar 30, as shown in Fig. 5, which may be bolted directly to the frame, as shown, and on which may be adjustably mounted by the clamp 17 a tooth, which may be utilized to cultivate close to the plant, and may be in rear of the hopper, as shown in full lines, or in advance thereof, as shown in dotted lines in Fig. 5, this enabling me to bring the line of cultivation close to the row and position it either in advance or in rear of the hopper, as may be desired.

With an implement constructed as shown and described the operations of fertilizing, cultivating and covering the fertilizer may be simultaneously performed, the one implement serving to accomplish all three of these results, and economy in cultivation of crops is therefore secured.

I claim:—

1. In a combined cultivator and fertilizer distributer, the combination with a supporting frame having a rigid side rail which diverges outwardly on one side at the rear of said supporting frame, of a fertilizer distributer and traction wheel for hopper-feed mounted on the center of said frame, an opener operating in advance of the hopper-feed, a cultivator tooth positioned on said frame at one side of the row, and a fertilizer coverer mounted on said outwardly diverging side rail on the other side of the row and adjustable thereon longitudinally and transversely of the frame.

2. In a combined cultivator and fertilizer distributer, the combination with a supporting frame, of a fertilizer hopper and traction wheel for hopper-feed mounted thereon, an opener, a cultivator tooth positioned on said frame to operate on one side of the row, a supplemental frame detachably connected to the rear of said supporting frame and having a rearwardly diverging side rail, and a fertilizer coverer adjustably positioned on said rearwardly diverging side rail on the side of the row opposite the cultivator tooth.

3. In a combined cultivator and fertilizer distributer, the combination with a supporting frame, of a fertilizer hopper and traction wheel for hopper-feed mounted thereon, a spout for said hopper delivering at one side of the implement, a tooth-supporting rail mounted at the side of said main supporting frame and parallel with the line of draft, a cultivator tooth adjustably mounted on said side rail, an outwardly diverging or flaring rail at the rear of the supporting frame, and a cover adjustably mounted on said flaring rail outside of the line of deposit of the fertilizer.

4. In a combined cultivator and fertilizer distributer, the combination with a supporting frame having rigid rails diverging on each side at an angle from its rear end, of a fertilizer hopper and traction wheel for hopper-feed mounted on said supporting frame, an opener coöperating with the hopper feed, a cultivator tooth positioned on said frame to operate on one side of the row, a centrally-placed rail in rear of said hopper, a depth-regulating and supporting wheel adjustably mounted on said centrally-placed rail, and a cultivator tooth adjustably mounted on one of said rearwardly diverging side rails.

5. In a combined cultivator and fertilizer distributer, the combination with a supporting frame, of a fertilizer hopper and traction wheel for hopper-feed mounted thereon, a side-delivery feed-spout for said hopper, a tooth-supporting side rail detachably mounted on said main frame parallel with the line of deposit of said feed-spout, and a cultivator tooth mounted on said side rail.

6. In a combined cultivator and fertilizer distributer, the combination with a supporting frame, of a fertilizer hopper and traction wheel for hopper-feed mounted thereon, a side-delivery feed-spout for said hopper, a tooth-supporting side rail mounted on said main frame parallel with the line of deposit of said feed-spout, and a cultivator tooth adjustably mounted on said side rail.

7. In a combined cultivator and fertilizer distributer, the combination with a supporting frame, of a fertilizer hopper and traction wheel for hopper feed mounted thereon, a feed spout delivering at one side of the implement and provided with mouths to deliver fertilizer on both sides of a row, and cultivating and covering teeth positioned on said frame in rear of said delivery spout that together act on both sides of the row.

8. In a combined cultivator and fertilizer distributer, the combination with a supporting frame, of a fertilizer hopper and traction wheel for hopper feed mounted thereon, a single feed-spout having a plurality of mouths to deliver fertilizer at one side of the longitudinal axis of the implement and on both sides of a row, and cultivating and covering teeth adjustably positioned on said frame in rear of said delivery spout to act on both sides of the row being fertilized.

9. In a combined cultivator and fertilizer distributer, the combination with a supporting frame, of a fertilizer hopper and traction wheel for hopper-feed mounted thereon, and a divided feed-spout for said hopper directed to one side of the implement and having a plurality of mouths delivering along separated lines parallel to the direction of travel.

10. A divided delivery spout for hoppers of agricultural implements having a plurality of mouths arranged to deliver at one side of said implement along separated lines parallel to the longitudinal axis of said implement.

11. A delivery spout for agricultural implements having a longitudinally-placed partition interiorly thereof dividing said spout into an upper and a lower channel with offset mouths that deliver along separated parallel lines at one side of the implement.

In testimony whereof I have hereunto set my hand in presence of two subscribing witnesses.

WILLIAM THOMAS LEAVELLE.

Witnesses:
  Wm. W. Butzner,
  Jno. W. Allison, Jr.

Copies of this patent may be obtained for five cents each, by addressing the "Commissioner of Patents, Washington, D. C."